A. BEALE.
Spoke-Socket.
No. 68,594.                               Patented Sept. 10, 1867.
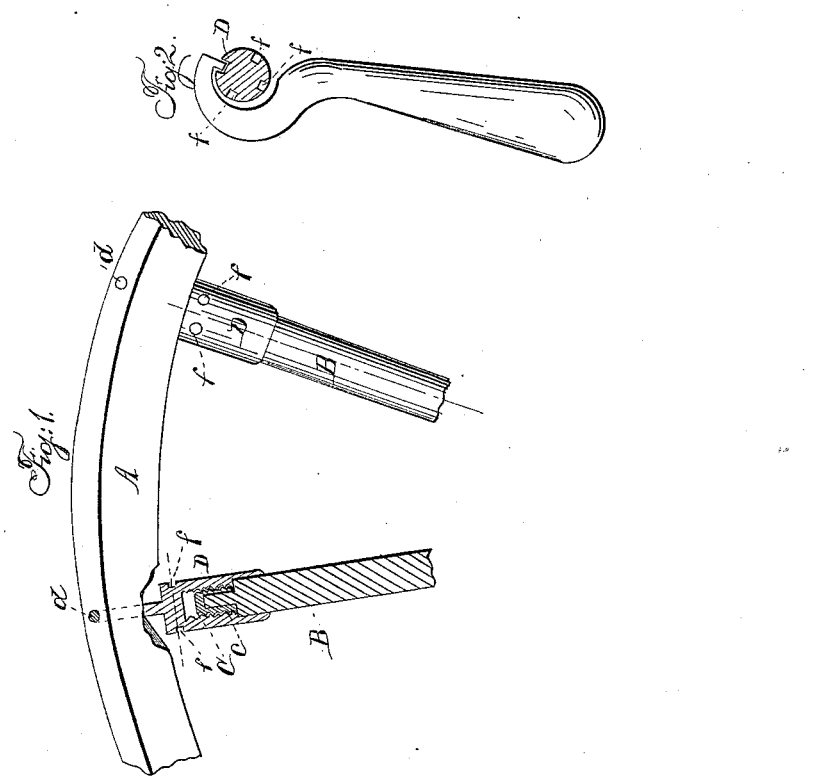

United States Patent Office.

AUGUSTUS BEALE, OF STAMFORD, CONNECTICUT.

*Letters Patent No. 68,594, dated September 10, 1867.*

---

IMPROVEMENT IN CARRIAGE-WHEEL.

---

*The Schedule referred to in these Letters Patent and making part of the same.*

---

TO ALL WHOM IT MAY CONCERN:

Be it known that I, AUGUSTUS BEALE, of Stamford, in the county of Fairfield, and State of Connecticut, have invented a new and useful Improvement in Carriage-Wheels; and I do hereby declare that the following is a full, clear, and exact description of the same, reference being had to the accompanying drawing, forming part of this specification, in which—

Figure 1 represents a side elevation of a portion of a wheel, showing my improvement in section and in side elevation.

Figure 2 is a side elevation of an instrument I find well adapted for operating my improvement.

My invention relates to an improvement in the construction of the wheels of vehicles, whereby the tire may at all times be tightened quickly, and without trouble or expense.

A designates a portion of the felloe of a carriage-wheel, and B B two of the spokes, the same being as much of the wheel as it was necessary to show in order to illustrate my invention. C is a metal cap, having a screw-thread cut upon its periphery, and a square socket in one end, into which socket is fitted a tenon, $c$, cut upon the outer end of the spoke B. D is a metal socket, carrying upon its solid end a small round tenon, $d$, which passes through the felloe, so that its end will be flush, or nearly so, with the circumference of the felloe. The interior of this socket D is provided with a thread, $e$, for a distance equal, or nearly so, to the length of the screw-cap C, and is otherwise made to receive the said cap C, which screws into it. Toward its upper end or mouth the socket has plain sides, so that the end of the spoke will slide in this part of the socket for a proper distance when the screw-cap C is operated. The solid end of the socket has recesses $f$ cut around its exterior, which are intended to receive the point of a spanner, (fig. 2,) when it is desired to turn the socket for tightening or loosening the tire. But the recesses may be dispensed with, if desired, and any other instrument, such as a pipe-wrench, be used for the purpose.

It will be seen from the above description that whenever it is desired to tighten or loosen the tire, it can be gradually done by merely turning the socket D, the effect of which is to screw out of or into the socket the cap C on the spoke, and hence throw outward the felloe, or allow it to spring inward. And it will also be observed that there is no joint anywhere for water to creep in to damage the parts. The socket rests against the felloe, with an evenly-fitted shoulder, and the end of the spoke enters into the socket so far that any ordinary lengthening of the spoke, so to speak, to expand the felloe, will not throw the spoke entirely out of the socket. And I will remark that if it be found desirable, a rubber or other suitable washer may be employed between the shoulder of the socket and the felloe, and rubber or other suitable packing may be stuffed in the end of the socket around the spoke.

I do not claim the tightening of the tires of the wheels of vehicles by the lengthening of the spoke or expanding the felloe of a wheel, as I am aware that this has been done before. For instance, I may cite the patent of C. J. Crane, issued October 24, 1865, (No. 50,635,) in which a thimble is set in the felloe, into which there is fitted a nut, and into which nut there is fitted to work a screw-rod, secured to the end of the spoke. By this device, when the tire is to be tightened, the nut is turned, which throws out the screw-rod, so as to leave a joint wide or narrow, according to the degree that the felloe is expanded between the nut and end of the spoke; in other words, the screw is exposed to rain and the action of the weather, and besides this, the only strength at such point depends entirely upon the size of the screw-rod. And more than this, in order to permit of the screw-rod having any proper size, a large hole or mortise has to be cut through the felloe in order to insert also the thimble, which tends to greatly weaken the felloe. But with the device I employ, the symmetry of the spoke from the hub to the felloe is perfect, and it is as strong at one part as at another; and more than this, I am enabled to use a smaller tenon on the end of the socket, so small as not to impair the strength of the felloe in any degree, and in nowise as much as where tenons of wooden spokes are put directly in mortises in the felloe. I will remark that I do not claim anything which is shown or described in the patent of the said Crane.

What I claim as my invention, and desire to secure by Letters Patent, is—

In combination with a spoke and felloe of the wheel of a vehicle I claim the socket D and screw-cap C, when both parts are constructed, arranged, and operating in substantially the manner herein specified.

AUGUSTUS BEALE.

Witnesses:
EDWIN SCOFIELD, Jr.,
OSCAR SHERWOOD.